March 25, 1947. J. C. KOONZ ET AL 2,417,832
SOLENOID
Filed Nov. 23, 1942
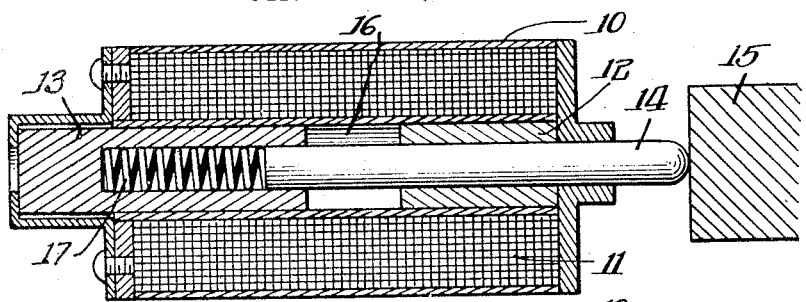
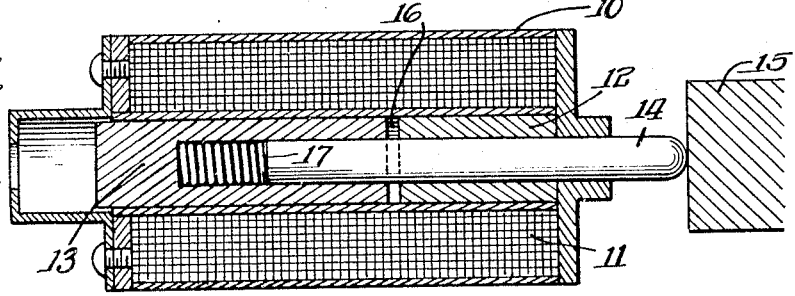
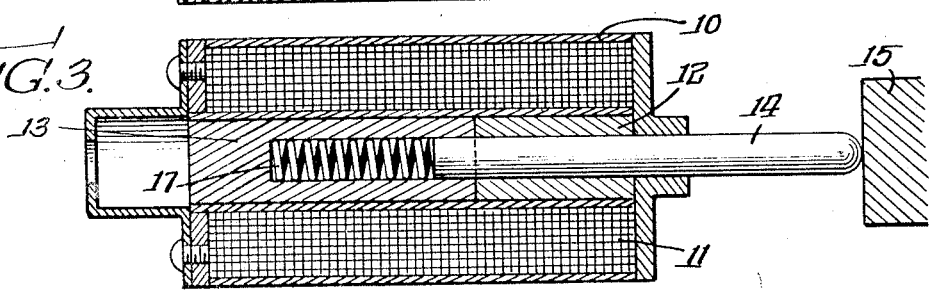
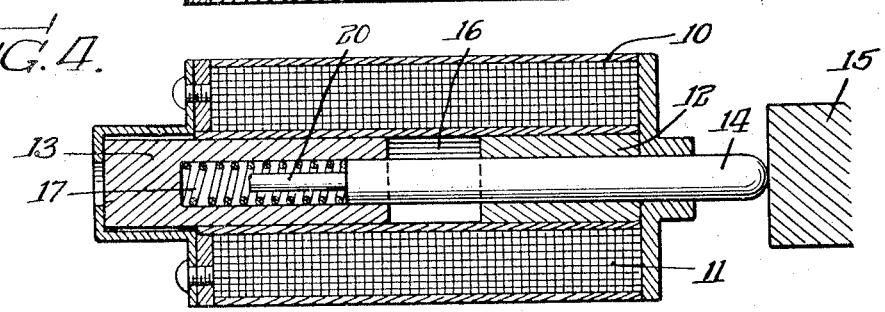
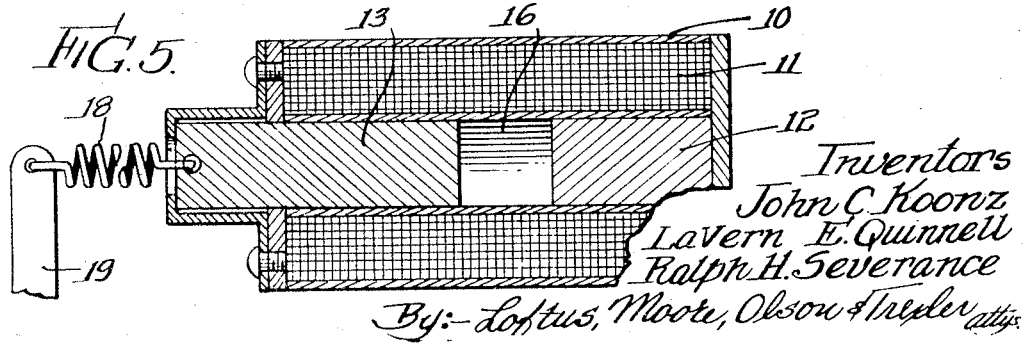
Inventors
John C. Koonz
LaVern E. Quinnell
Ralph H. Severance
By: Loftus, Moore, Olson & Trexler attys Patented Mar. 25, 1947

2,417,832

UNITED STATES PATENT OFFICE 2,417,832

SOLENOID

John C. Koonz, La Vern Edward Quinnell, and Ralph H. Severance, Fort Wayne, Ind., assignors to The Magnavox Company, Fort Wayne, Ind., a corporation of Indiana Application November 23, 1942, Serial No. 466,550

5 Claims. (Cl. 175—341)

It is an object of our invention to provide a combined electro-mechanical solenoid which combines accelerating attractive and mechanical forces to overcome load starting and moving resistance.

It is a further object of our present invention to provide a solenoid which, during the initial stages of its operation, stores up within itself mechanical energy in such a manner that the combined action of the solenoid and stored mechanical energy cooperate in overcoming the load starting resistance and carry the load to the completion of its travels in a highly efficient manner.

It is a further object of our invention to provide a solenoid which combines its accelerating attractive force with mechanical stored energy to overcome the starting load and thereafter carry the load through gradually diminishing power to the completion of its travel.

A further object of our invention is to provide a solenoid with means for storing mechanical energy during the initial travel of the plunger which stored energy upon further travel of the plunger assists in overcoming the load starting resistance and thereafter moves the load to its limit after the plunger comes to rest.

It is a further object of our invention to provide a solenoid of minimum size adapted to overcome a relatively high starting load resistance by combining and concomitantly utilizing accelerating attractive and mechanical forces.

It is a further object of our invention to provide an electro-mechanical solenoid so designed and arranged that the plunger is permitted to travel to practically its closing position where its maximum force is reached, and this maximum force is then applied to the load starting resistance.

The above and other objects and advantages will become apparent from a detailed description of the accompanying drawings in which we have illustrated a device embodying a preferred form of our invention as well as a modification thereof; but the constructions shown are to be understood as illustrative only and not as defining the limits of our invention.

In the drawings:

Fig. 1 is a cross-sectional view of an electrical mechanical solenoid with the plunger in its unenergized position showing one embodiment of our invention.

Fig. 2 is a similar view of the same solenoid but illustrating the solenoid after being energized, showing the plunger moved almost to its closed position and to the position where the spring is compressed until the force it exerts on the plunger shaft equals substantially that of the load, whereby, upon further movement of the plunger to closed position, the accelerating attractive force of the solenoid and the mechanical stored energy of the spring overcome the starting load resistance.

Fig. 3 is a similar view with the plunger in its closed position illustrating the compression spring expanded for moving the plunger shaft with gradually diminishing power after the plunger has reached its closed position.

Fig. 4 is a cross-sectional view illustrating a modification of our device with the moving parts in their position when the solenoid is de-energized.

Fig. 5 shows a further modification combined with an external controlling spring.

Referring more in detail to the drawings, the solenoid illustrated has a steel case 10, coil 11, a fixed core 12, a movable steel plunger 13, plunger shaft 14 which acts directly on the load represented by 15. Between the fixed core and plunger is an air gap 16.

The plunger is provided with an axial bore. Mounted therein and interposed between the plunger and the plunger shaft is a compression spring 17. The particular spring illustrated in the embodiment shown in the drawings is so designed with respect to the other parts of the solenoid and the accelerating attractive force of the solenoid and the load resistance at the start that it will be compressed when the solenoid is energized until the force exerted by the compression springs equals substantially that of the starting load resistance. It is so shown in Fig. 2 where it has been so compressed by the solenoid after being energized and is so designed that this balance or condition is attained just before the plunger reaches its closed position, whereby, during the further short closing position of the plunger, both the accelerating attractive force of the solenoid and the compression spring combine their forces in overcoming the load resistance at the start. When the plunger has moved to closed position the stored-up energy in the compression spring continues to drive the plunger shaft and move the load to the position shown in Fig. 3. The purpose of so designing the parts of our solenoid so that both the accelerating force and the stored-up energy of the compression spring jointly and concomitantly exert force on the plunger shaft just before the plunger reaches its closed position is because we have found that the accelerating attractive force of the plunger is most efficient and affords its maximum force practically at the closure of the air gap. Thus, with our solenoid, a load which has a high initial resistance and a decreasing resistance through its length of travel can be operated by a relatively small solenoid. This is very important in many fields where weight, size and bulk is a factor, particularly in devices used in connection with air craft.

The spring or other medium which stores up mechanical energy may be located any place between the plunger and the load, and the solenoid may be arranged to be either a push or pull type.

In some cases, the size of the spring or other mechanical medium required may become so large that it is not convenient to locate it inside the solenoid. In Fig. 5, we have illustrated a modification of our electro-mechanical solenoid with a spring located outside the solenoid. In this form, instead of an expansion spring, we provide a contraction spring 18 which is connected at one end to the plunger 13 and at the opposite end to a lever 19. The latter is connected with the load. In order to operate the load, the lever 19 must be moved toward the solenoid. When the solenoid is energized, the plunger is moved toward the fixed core to air gap closing position. The contraction spring 18 is so designed and arranged with respect to the load resistance at the start, and when the plunger is practically at closing position, the contractive force of the spring 18 and the accelerating attractive force of the solenoid combine and cooperate to overcome the initial load resistance at the start. After the solenoid has reached its closed position, the spring 18, due to its contractive force or power, continues to move the load.

In Fig. 4, we have shown an extension 20 fixed to the plunger shaft, which member 20 extends a substantial distance into the compression spring 17. When the spring 17 is only partially compressed, this extension abuts against the bottom of the bore or well in the plunger to prevent further compression upon further movement of the plunger. With this particular construction, as will be clear from the drawing, the attractive force, the kinetic energy, and the mechanical energy stored up in the spring cooperate for a longer interval in concomitantly exerting the respective forces on the load through the plunger shaft.

There are many variations of design that can be made without departing from the spirit of our invention, depending on the load characteristic and the solenoid characteristic, but broadly, our invention combines the force distance characteristic of a solenoid with the force distance characteristic of the energy stored in a spring or other mechanical medium by the initial operation of the solenoid.

It is not intended to limit this invention to any particular design of solenoid or energy-storing spring or other medium. From a broad aspect, the invention contemplates combining the characteristic of a solenoid with energy-storing means operated by the solenoid whereby a highly efficient mechanism is afforded as to size and weight and which is highly useful for moving loads having high starting resistance with a falling load characteristic for the remainder of the distance traveled. Therefore, we do not wish to limit ourselves to the particular forms or types of construction shown, except as may be called for by the following claims when properly construed in the light of the law applicable.

Having thus described our invention, we claim:

1. In a combined electro-mechanical solenoid for moving a load having a starting resistance exceeding the initial attractive force of the solenoid, the combination of a coil, a plunger in said coil, a stationary core of magnetic material in said coil and toward which the plunger is attracted on energization of the coil, said core being positioned to limit the movement of the plunger and to increase the attractive force on the plunger as said plunger approaches said limit of movement, a load operating member, and energy storing means interposed between and mechanically connected to the plunger and load operating member and in which means energy is stored by the plunger until the accelerating attractive force of the core on the plunger overcomes the load starting resistance as the plunger approaches its limit of movement and for thereafter continuing the movement of the load when the plunger has been brought to rest by engagement with said core.

2. A combined electro-mechanical solenoid comprising in combination a coil, a plunger movably mounted in said coil for movement under the action of said coil when the latter is energized, a stationary core member in the magnetic field of said coil and positioned to limit the movement of said plunger, said core member being of magnetic material and arranged to increase the attractive force on the plunger as the plunger approaches its limit of movement determined by said member, a plunger shaft movably mounted in said coil and adapted to directly act on a load, mechanical energy storing means interposed between the plunger shaft and the plunger for storing energy to continue the movement of the plunger shaft after the starting load resistance of the load connected plunger shaft has been overcome by the increasing attractive force of the core member on the plunger as the plunger approaches its limit of movement determined by said core member.

3. In an electro-mechanical solenoid, the combination of a coil, a plunger movably mounted in said coil, a stationary core in the electro-magnetic field of said coil toward which the plunger is attracted on energization of the coil, said core being of magnetic material and positioned to limit the movement of the plunger and increase the attractive force on the plunger as the plunger approaches said limit of movement, said plunger and core having aligned openings therein, a plunger shaft mounted in said opening and a coil spring mounted in the opening in said plunger, said spring being interposed between the plunger and plunger shaft and having energy stored therein by the plunger until the accelerated attractive force of the core on the plunger overcomes the load starting resistance of the plunger shaft as the plunger approaches its limit of movement determined by said core for continuing the movement of the plunger shaft after the plunger has reached said limit of movement, and means for limiting the relative movement of said plunger with respect to said plunger shaft when said spring has been partially compressed to cause said plunger to directly engage said plunger shaft just prior to the engagement of said plunger with said core.

4. In an electro-mechanical solenoid, the combination of a coil, a plunger movably mounted in said coil, a stationary core in said coil and toward which the plunger is attracted on energization of the coil, said core being of magnetic material and positioned to limit the movement of the plunger and increase the attractive force on the plunger as the plunger approaches said limit of movement, a contraction spring connected at one end with said plunger and adapted to be connected at the other end to a load operating member, said contraction spring being constructed and arranged to store up energy during the movement of the plunger and until the accelerated attractive force of the core on the plunger as the plunger approaches its limit of movement overcomes the load starting resistance on the load operating member whereby the spring moves the load through the load operating member after the plunger has reached said limit of movement.

5. A combined electro-mechanical solenoid comprising a coil, a movable plunger, a fixed core part limiting the movement of the plunger, said core part being of magnetic material and positioned to increase the attractive force on the plunger as the plunger approaches its limit of movement determined by said core part, a load-moving plunger slidable in said core part, a compression spring interposed between the plunger shaft and the plunger and compressed by the plunger until, as it approaches its limit position, the accelerating attractive force of the core part on the plunger overcomes the initial load resistance on the plunger shaft whereby the spring continues movement of the load moving plunger shaft after the plunger has been brought to rest by engagement with the core part.

JOHN C. KOONZ.
LA VERN EDWARD QUINNELL.
RALPH H. SEVERANCE.

REFERENCES CITED

The following references are of record in the file of this patent:

UNITED STATES PATENTS

| Number | Name | Date |
|---|---|---|
| 1,236,177 | Jacobs | Aug. 7, 1917 |
| 1,000,934 | Ostermann | Aug. 15, 1911 |
| 1,811,883 | Goodrich | June 30, 1931 |
| 2,170,961 | Borgkvist | Aug. 29, 1939 |
| 854,741 | Hewlett | May 28, 1907 |
| 2,098,196 | Ray | Nov. 2, 1937 |

FOREIGN PATENTS

| Number | Country | Date |
|---|---|---|
| 152,551 | German | June 24, 1904 |

---

Certificate of Correction

Patent No. 2,417,832.    March 25, 1947.

JOHN C. KOONZ ET AL.

It is hereby certified that error appears in the printed specification of the above numbered patent requiring correction as follows: Column 5, line 20, claim 5, after "plunger" insert the word *shaft*; and that the said Letters Patent should be read with this correction therein that the same may conform to the record of the case in the Patent Office.

Signed and sealed this 26th day of August, A. D. 1947.

[SEAL]

LESLIE FRAZER,
*First Assistant Commissioner of Patents.*